United States Patent
Powell et al.

(10) Patent No.: US 12,092,250 B2
(45) Date of Patent: Sep. 17, 2024

(54) FREEZE RESISTANT QUICK CONNECT FITTING

(71) Applicant: Parker-Hannifin Corporation, Cleveland, OH (US)

(72) Inventors: Steven M. Powell, Chardon, OH (US); Ty A. Henry, Atwater, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 18/011,966

(22) PCT Filed: Aug. 18, 2021

(86) PCT No.: PCT/US2021/046406
§ 371 (c)(1),
(2) Date: Dec. 21, 2022

(87) PCT Pub. No.: WO2022/066324
PCT Pub. Date: Mar. 31, 2022

(65) Prior Publication Data
US 2023/0243452 A1    Aug. 3, 2023

Related U.S. Application Data (60) Provisional application No. 63/083,185, filed on Sep. 25, 2020, provisional application No. 63/111,870, filed on Nov. 10, 2020.

(51) Int. Cl.
*F16L 37/14*  (2006.01)
(52) U.S. Cl.
CPC .................. *F16L 37/142* (2013.01)
(58) Field of Classification Search
CPC .................. F16L 37/142; F16L 37/144
See application file for complete search history.

(56) References Cited

U.S. PATENT DOCUMENTS 3,929,357 A    12/1975  Devincent et al.
5,366,259 A *  11/1994  Hohmann ............. F16L 37/144
                                                          285/308

(Continued)

FOREIGN PATENT DOCUMENTS

DE    8624767 U1    12/1987
DE    4310192 C2    5/2001

(Continued)

OTHER PUBLICATIONS

International Search Report and Written Opinion of the International Searching Authority for corresponding International Patent Application No. PCT/US2021/046406, dated Nov. 26, 2021.

*Primary Examiner* — James M Hewitt, II
(74) *Attorney, Agent, or Firm* — Renner, Otto, Boisselle & Sklar, LLP (57) ABSTRACT

A metallic fitting assembly employs a clip-to-body attachment for locking a tube end of a fluid system component to the fitting assembly. The fitting assembly includes a fitting body defining a fluid flow path between a first end and a second end opposite from the first end. The first end receives a tube end of a first fluid system component, and the fitting body defines a clip slot adjacent to the first end, and a material of the fitting body includes metal; and a clip wherein a material of the clip includes metal. When the tube end is inserted through the first end of the fitting body, the clip is inserted through the clip slot and around the tube end to engage the tube end in a connected state in which the tube end is locked within the fitting body. The fitting body includes a main body and a ring end that define the clip slot between the main body and the ring end, the main body and the ring end being attached to each other by a bridge. For freeze resistance, the ring end minimizes distortion of the ring end to 0.010" (0.25 mm) or less at a tensile load of 500 lbf (2200 Newtons). A ratio of a cross-sectional area of the (Continued)

ring end to an inner diameter of the fitting body may be from 21% to 73%. The bridge may have a width within a range of 20% to 70% of an outer diameter of the fitting body.

16 Claims, 4 Drawing Sheets

(56) References Cited

U.S. PATENT DOCUMENTS

| | | | |
|---|---|---|---|
| 5,593,187 A | 1/1997 | Okuda et al. | |
| 5,964,483 A | 10/1999 | Long et al. | |
| 5,992,903 A | 11/1999 | Bartholomew | |
| 6,604,760 B2* | 8/2003 | Cresswell | F16L 37/0887 |
| | | | 285/305 |
| 6,857,665 B2* | 2/2005 | Vyse | F16L 19/005 |
| | | | 285/388 |
| 6,908,119 B2 | 6/2005 | Murken | |
| 7,938,455 B2* | 5/2011 | Rapp | F02M 55/002 |
| | | | 285/305 |
| 8,925,974 B2 | 1/2015 | Nagaya et al. | |
| 9,273,812 B2 | 3/2016 | Bassaco | |
| 10,550,982 B2* | 2/2020 | Pepe | F16L 37/0885 |
| 2013/0014963 A1* | 1/2013 | Porta | A62C 31/02 |
| | | | 285/305 |
| 2013/0220467 A1* | 8/2013 | Ristovski | F16L 37/144 |
| | | | 138/104 |

FOREIGN PATENT DOCUMENTS

| | | |
|---|---|---|
| EP | 0811798 A2 | 12/1997 |
| EP | 2054615 B1 | 2/2011 |
| WO | 2008019912 A1 | 2/2008 |

* cited by examiner

FREEZE RESISTANT QUICK CONNECT FITTING

RELATED APPLICATIONS

This application is a national phase of International Application No. PCT/US2021/046406 filed on Aug. 18, 2021, which claims the benefit of U.S. Provisional Application No. 63/083,185 filed on Sep. 25, 2020, and of U.S. Provisional Application No. 63/111,870 filed on Nov. 10, 2020, the contents of which are incorporated herein by reference.

FIELD OF INVENTION

The present application relates generally to quick connect fittings for connection of components of a fluid system, for example quick connect fittings for liquid fuel and vapor systems or emission systems, and in particular relates to freeze resistant quick connect fittings for use in low temperature applications.

BACKGROUND OF THE INVENTION

Quick connect fittings for connection of components of a fluid system are used in a variety of applications for the transfer of fluid through the system. Quick connect fittings operate by joining the fitting to a mating tube end. One example is the use of quick connect fittings for liquid fuel and vapor delivery systems and related emission systems that conform to the SAE J2044 standard. Example applications include gasoline and diesel fuel delivery systems and their related venting or evaporative emission control systems. Accordingly, quick connect fittings need to be able to operate under a wide variety of environmental and operating conditions, including over substantial ranges of operating and environmental temperature and pressure conditions. For example, SAE J2044 sets forth temperature and pressure operating ranges for associated fuel delivery and emission systems.

As the nomenclature denotes, a "quick" connect fitting should be relatively simple for an operator to connect. Conventional fitting configurations, however, often employ threaded components that must be rotated relative to each other, which may require special tools. Connection, therefore, may be rendered difficult in tight spaces. In addition, conventional quick connect fittings often are made of one or more thermoplastic components, which may have difficulty in accommodating the wide range of environmental and operating conditions. For example, when exposed to sub-freezing conditions, expanding diesel exhaust fluid may crack or break thermoplastic fitting components. In addition, fuel delivery and exhaust systems can operate at high temperatures that can degrade thermoplastic fitting components. Accordingly, conventional quick connect fittings can be deficient as to ease of connection and as to effectiveness across the wide range of potential environmental and operating conditions.

In one application of quick connect fittings, diesel emission after treatment systems utilize aqueous urea (high ammonia solutions) for nitrous oxide reduction. These fluids have a freeze temperature of about 13° F., and thus environmental conditions in cold climates can cause the fluid to freeze. Freezing urea expands and produces excessive forces on fluid conveyance hoses and fittings. Conventional quick connect fittings in such applications utilize plastic SAE J2044 connectors due to their chemical compatibility, ease of use, and low cost. As referenced above, such conventional plastic fittings are susceptible to fitting failure from high tensile loading during a fluid freeze event, and thus conventional configurations of quick connect fittings are deficient particularly for use in low temperature conditions.

SUMMARY OF THE INVENTION

There is a need in the art, therefore, for an enhanced quick connect fitting that is easy to connect and effective over a wide range of environmental and operating conditions, such as temperature and pressure. In exemplary embodiments, the quick connect fitting conforms to the SAE J2044 standards for liquid fuel and vapor delivery systems and related emission systems. Embodiments of the present application employ an all-metallic fitting design, the metallic materials having a yield strength above 50 kpsi and being suitable for service at high temperatures (e.g., above 200° F.), and at low temperatures below which aqueous urea commonly utilized in diesel emission systems may freeze (e.g., below 13° F.). The all-metallic design greatly increases durability and reliability of the fitting as compared to conventional configurations, and particularly is suitable under conditions in which conveyed fluids may freeze and fracture conventional thermoplastic fitting components due to expansion. The fitting embodiments of the present application, therefore, are essentially freeze-resistant and thus overcome the deficiencies of conventional configurations while still providing effective chemical resistance and ease of use.

In exemplary embodiments, the quick connect fitting includes a metal fitting body and a metal wire clip connection component that is utilized to connect the fitting body to a tube end of a fluid system component. The use of a wire clip as a connection component reduces design complexity and cost, and improves user ease of use. With the fitting body and clip components being constructed of metal, a user has design freedom on the design and construction of the fitting body portion that attaches to a tube or hose. Conventional plastic materials limit this design freedom due to the lower strength of such plastic materials.

The clip-to-body attachment is made without threaded connections, and thus does not require rotation of either fitting component (body or clip) for assembly. This enhances the ease of assembly and is particularly suitable for tight spaces in which component rotation is difficult to achieve using typical tools. The clip can be removed with common hand tools, such as for example a screw driver or pliers that can wedge the clip from the fitting body, and thus the configuration does not employ a dedicated removal component added to the fitting as is common in conventional configurations. The clip is light weight and retains itself to the male end of a connected tube component. The clip, therefore, does not require any additional retention or interference by the fitting body to maintain the clip in place. In contrast, conventional fittings employ stamped stainless steel pieces inside of the fitting body to aid in connecting the tube end, and thus the fitting body is required to be specifically formed for assembly and retention of the tube connection. The ease of removal of the clip in turn allows easy access to the internal components of the fitting, such as access to O-rings or other sealing components, to allow the fitting to be readily serviced. Conventional fittings have stamped pieces roll-formed in place by the fitting body, which prevent easy servicing.

An aspect of the invention is a metallic fitting assembly that is freeze resistant and that employs a clip-to-body attachment for locking a tube end of a fluid system component to the fitting assembly. In exemplary embodiments, the fitting assembly includes a fitting body defining a fluid flow path between a first end and a second end opposite from the first end, wherein the first end is configured to receive a tube end of a first fluid system component, and the fitting body defines a clip slot adjacent to the first end, and a material of the fitting body includes metal; and a clip wherein a material of the clip includes metal. When the tube end is inserted through the first end of the fitting body, the clip is inserted through the clip slot and around the tube end to engage the tube end in a connected state in which the tube end is locked within the fitting body. The fitting body includes a main body and a ring end that define the clip slot between the main body and the ring end, the main body and the ring end being attached to each other by a bridge. To be freeze resistant, the ring end is configured to minimize distortion to 0.010" (0.25 mm) or less at a tensile load of 500 lbf (2200 Newtons). To minimize distortion in such manner, a ratio of a cross-sectional area of the ring end to an inner diameter of the fitting body may be from 21% to 73%. The bridge may have a width within a range of 20% to 70% of an outer diameter of the fitting body.

The clip includes first and second opposing legs that extend from a transverse segment, wherein in the connected state the transverse segment spans across the bridge of the fitting body and the opposing legs extend through the clip slot. Each of the first and second legs may include a first segment that extends from the transverse segment; a second segment that extends from the first segment in a direction away from the transverse segment, wherein the second segment of the first leg and the second segment of the second leg are oppositely are curved about a center point suitable for locking around the tube end; a third segment that extends from the second segment in a direction away from the transverse segment; and a fourth segment that extends from the third segment in a direction away from the transverse segment, and the fourth segment of the first leg and the fourth segment of the second leg respectively are flared in opposite directions from the third segment of the first leg and the third segment of the second leg. The first segments may extend from the transverse segment at substantially right angles such that the first segment of the first leg and the first segment of the second leg are parallel, and the third segments respectively are aligned with the first segments.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present application will now be described with reference to the drawings, wherein like reference numerals are used to refer to like elements throughout. It will be understood that the figures are not necessarily to scale.

Embodiments of the present application provide an enhanced quick connect fitting assembly that is easy to connect and effective over a wide range of environmental and operating conditions, such as temperature and pressure. In exemplary embodiments, the quick connect fitting assembly conforms to the SAE J2044 standards for liquid fuel and vapor delivery systems and related emission systems. Embodiments of the present application employ an all-metallic fitting assembly design, the metallic materials having a yield strength above 50 kpsi and being suitable for service at high temperatures (e.g., above 200° F.). The all-metallic design greatly increases durability and reliability of the fitting as compared to conventional configurations, and particularly is suitable under conditions in which conveyed fluids may freeze and fracture conventional thermoplastic fitting components due to expansion. The fitting assembly embodiments of the current disclosure, therefore, are essentially freeze-resistant.

Figure 1:
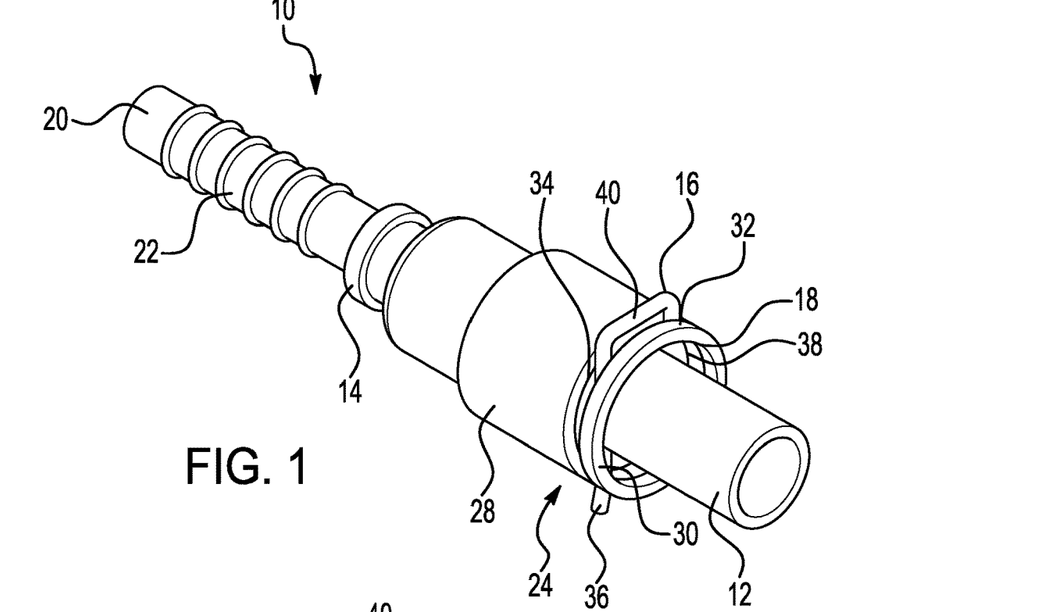
FIG. 1 is a drawing depicting a perspective view of an exemplary fitting assembly in accordance with embodiments of the present application, the fitting assembly shown connected to a tube end.
Figure 2:
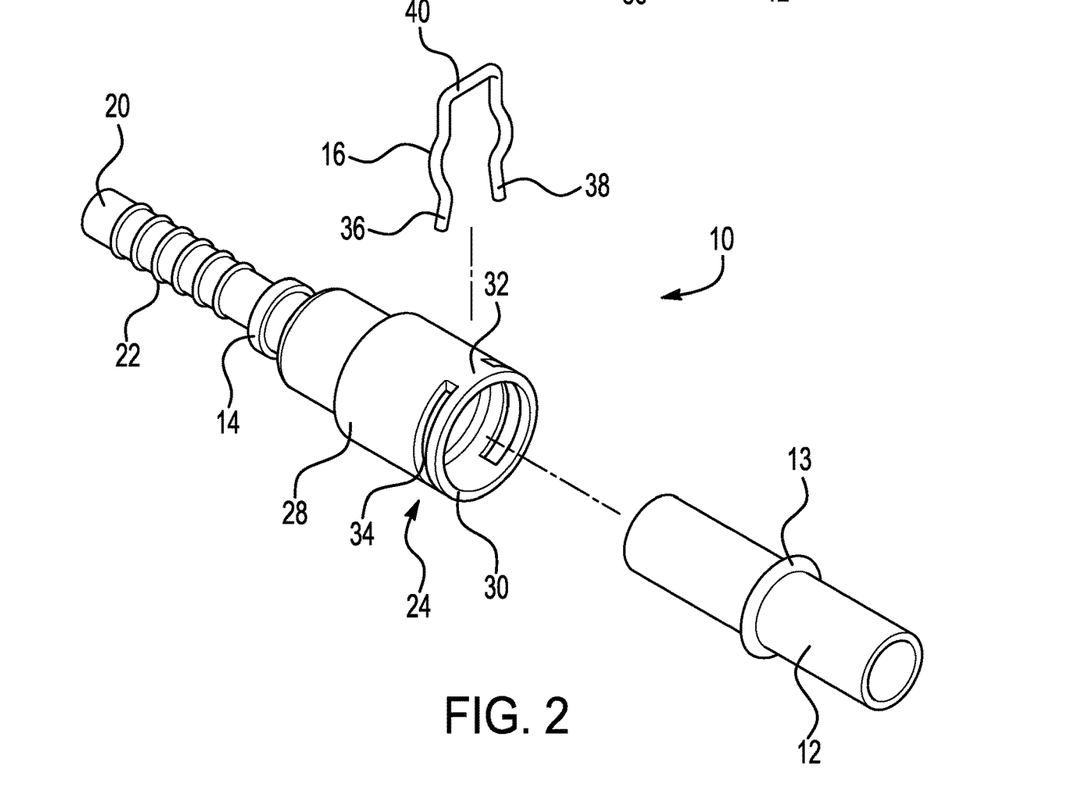
FIG. 2 is a drawing depicting a perspective view of the fitting assembly and tube end of FIG. 1 with the individual components separated.

FIG. 1 is a drawing depicting a perspective view of an exemplary fitting assembly 10 in accordance with embodiments of the present application, the fitting assembly 10 shown connected to a tube end 12. FIG. 2 is a drawing depicting a perspective view of the fitting assembly 10 and tube end 12 of FIG. 1 with the individual components separated. In exemplary embodiments, the quick connect fitting assembly 10 includes a fitting body 14 and a wire clip connection component 16 that is utilized to connect the fitting body 14 to the tube end 12 of a fluid system component. The use of the wire clip 16 as a connection component reduces design complexity and cost, and improves user ease of use.

In exemplary embodiments, both the fitting body 14 and the clip 16 are made of a material that includes metal, which should be capable of withstanding the varying range of operational and environmental conditions, be sufficiently strong to withstand operating pressures, and be non-corrosive particularly for use in fuel delivery and exhaust systems. Suitable materials include carbon based or stainless steel materials or brass, which satisfy the physical requirements and are cost-effective. Plated steel materials, such as nickel-plated steel, may be utilized in certain applications, although plated steels may be more expensive and not as readily usable in certain corrosive environments. With the fitting body and clip components being constructed of a material that includes metal, a user has design freedom on the design and construction of the fitting body portion that attaches to a tube or hose. Conventional plastic materials limit this design freedom due to the lower strength of such plastic materials. The fluid system component that includes the tube end 12 may be made of any suitable material as is conventional in fluid flow systems, such as a rigid plastic, steel or other metal, plastic coated or plated steel, or other suitable materials as are commonly used in fluid system components.

As further detailed below, the clip-to-body attachment is made without threaded connections, and thus does not require rotation of either fitting component (body or clip) for assembly, which results in numerous advantages over conventional configurations. The clip-to-body attachment enhances the ease of assembly and is particularly suitable for tight spaces in which component rotation is difficult to achieve using typical tools. The clip 16 can be removed from the fitting body 14 with common hand tools, such as for example a screw driver or pliers that can wedge or "pop" the clip from the fitting body, and thus the configuration does not employ a dedicated removal component added to the fitting body as is common in conventional configurations. The clip 16 is light weight but still retains itself effectively to the male end of the connected tube component 12. The fitting assembly, therefore, does not require any additional retention or interference features incorporated into the fitting body to maintain the clip in place. The ease of removal of the clip 16 in turn allows easy access to the internal components of the fitting assembly, such as access to O-rings or other sealing components, to allow the fitting to be readily serviced.

In contrast, conventional fittings typically employ stamped stainless steel pieces inside of the fitting body to aid in connecting and retaining the tube end, and thus the fitting body is required to be specifically formed for assembly and retention of the tube connection. Conventional fittings have stamped metal J2044 connectors or pieces roll-formed in place with the fitting body, which prevent easy servicing. Such all-metal roll-formed body designs cannot be disassembled with common hand tools. Many conventional configurations also use plastic spacers and a plastic retainer for the O-rings. Embodiments of the present application include only two retention components (body and clip) that receive the O-ring seals, which prevents the possibility of the O-ring retention components being pushed out of place during a hard-freeze due to expansion of the diesel exhaust fluid.

The fitting body 14 includes a first end 18 and a second end 20 opposite from the first end 18. The first end 18 is configured to receive the tube end 12. As further detailed below, when the tube end 12 is inserted through the first end 18 of the fitting body 14, the clip 16 engages with the tube end 12 and the fitting body 14 in a manner that locks the tube end 12 within the fitting body 14, referred to as the connected state. In this example, an outer surface of the fitting body 14 is stepped, although the fitting body 14 may be shaped in any manner suitable for a particular application. In the example as depicted in FIGS. 1 and 2, the second end 20 of the fitting body 14 is configured as a nipple for receiving a hose or like component. The nipple second end 20 is configured with a plurality of ribs 22. When a hose is pushed over the second end 20, the ribs 22 aid in retention of the hose to the fitting assembly. Although in this example the second end 20 is configured as a ribbed nipple for receiving a hose, other types of fluid connections may be employed as the second end 20 as may be suitable for any particular application.

Figure 3:
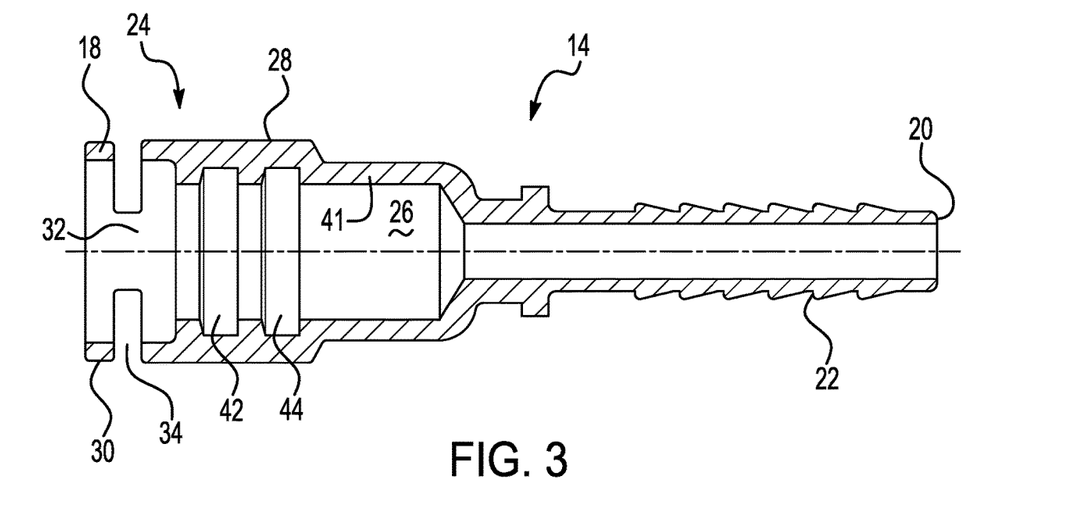
FIG. 3 is a drawing depicting top cross-sectional view of a fitting body component of the fitting assembly of FIG. 1 in isolation.
Figure 4:
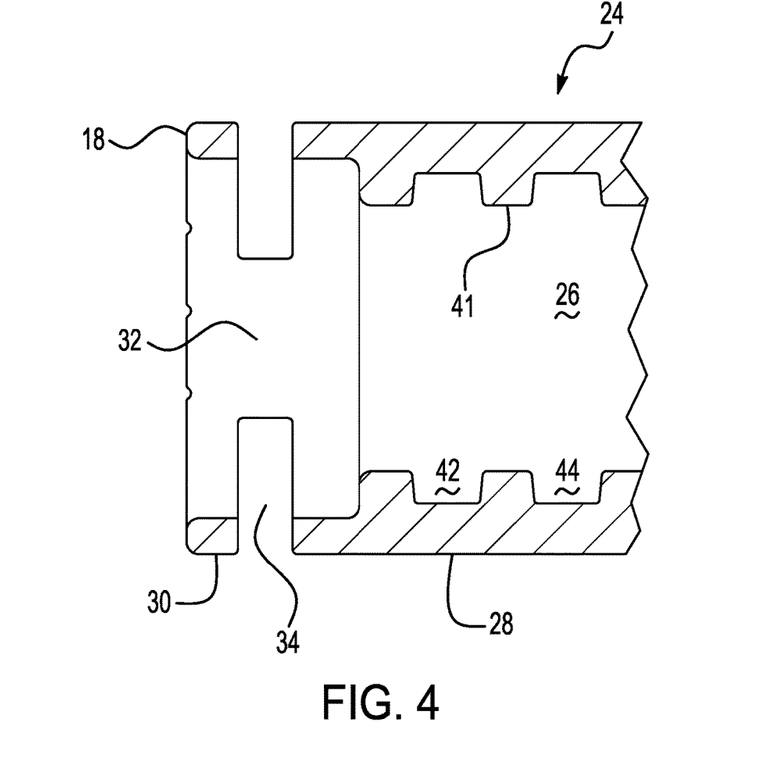
FIG. 4 is a drawing depicting a close-up view of a tube connecting end portion of the fitting body of FIG. 3.

FIG. 3 is a drawing depicting a top cross-sectional view the fitting body component 14 of the fitting assembly 10 of FIG. 1 in isolation. FIG. 4 is a drawing depicting a close-up view of a tube connecting end portion 24 of the fitting body 14 of FIG. 3. Referring to FIGS. 1-4 in combination, the tube connecting end portion 24 is positioned at the first end 18 of the fitting body. The fitting body 14 defines a fluid flow path 26 for the passage of a fluid between the first end 18 and the second end 20. The fitting body includes a main body 28 and a ring end 30 that is attached to main body 28 via a bridge 32. The main body 28 and the ring end 30 define a clip slot 34 that receives the clip 16, as seen most readily in the connected state depicted in FIG. 1.

To secure the tube end 12 to the fitting assembly 10, the tube end 12 is inserted through the first end 18 of the fitting body 14 toward the second end 20. The tube end 12 may include an interacting feature 13, such as for example one or more ridges or protrusions 13 (see particularly the separated view of FIG. 2), that can interact with the clip 16, and the tube end is inserted sufficiently such that any interacting feature 13 of the tube end 12 is located past the clip slot 34 relative to the first end 18 of the fitting body 14. Once the tube end is positioned as such, the clip 16 is inserted through the clip slot 34. Additional details of the structure and operation of the clip 16 are described below in connection with subsequent figures. In general, the clip 16 includes opposing legs 36 and 38 that extend from a transverse segment 40 (see FIGS. 1 and 2). The legs 36 and 38 form substantially right angles (e.g., 90°±10°) with the transverse segment 40 where the respective legs and transverse segment join. In the connected state as shown in FIG. 1, the transverse segment 40 spans across the bridge 32 of the fitting body 14. The clip legs 36 and 38 extend through the clip slot 34, and thus the clip is maintained in place within the clip slot between the main body 28 and ring end 30 of the fitting body 14. The legs are configured for a tight fit against an outer surface of the tube end 12, with any interacting feature 13 of the tube end 12 being farther from the first end 18 relative to the clip 16. In this manner, interaction of the clip legs 36 and 38 against the interacting feature (ridge) 13 of the tube end 12 prevents the tube end from pulling out from the fitting body 14.

To form the clip slot 34 while providing a surface to support the clip 16, the bridge 32 is configured as a partial portion of the fitting body 14 relative to the main body 28 and the ring end 30. In other words, the bridge 32 extends substantially less than the circumference or perimeter of the broader fitting body components to permit insertion of the clip 16 through the clip slot 34 in a manner that locks the tube end 12 within the fitting body as described above. The bridge 32, therefore, could potentially constitute a point of weakness and potential failure of the fitting assembly if the fitting body were made of a plastic material as used in many conventional configurations. Because the fitting body 14, including the bridge 32, is made of a metal-based material, the bridge 32 is sufficiently strong to permit the locking of the tube end without weakness or failure. Accordingly, conventional thermoplastic materials may be of insufficient strength to accommodate the clip-to-body attachment of the fitting assembly 10, in that an analogous thermoplastic bridge could break under forces associated with locking the tube end 12 with the clip 16.

Referring in particular to FIGS. 3 and 4, an inner diameter 41 of the fitting body 14 may include one or more sealing grooves that may be machined into the inner diameter of the fitting body. In the depicted example, two sealing grooves 42 and 44 are provided, and each of the sealing grooves may receive a respective sealing element, such as for example O-ring seals 43 and 45 (see FIG. 5). The sealing elements seal against fluid leakage between an outer surface of the tube end 12 and the inner diameter 41 of the fitting body 14 in the connected state. In an alternative embodiment, the internal diameter 41 may be constant, and sealing is performed by inserting a dedicated sealing element into the fitting body. Such a sealing element may be configured as a press fit frame made of a suitable rigid material, which incorporates one or more sealing components (e.g., O-ring seals) into the frame. Such a sealing element thus is press fit into the fitting body such that the sealing element comparably seals against fluid leakage between an outer surface of the tube end 12 and the inner diameter 41 of the fitting body 14

Figure 5:
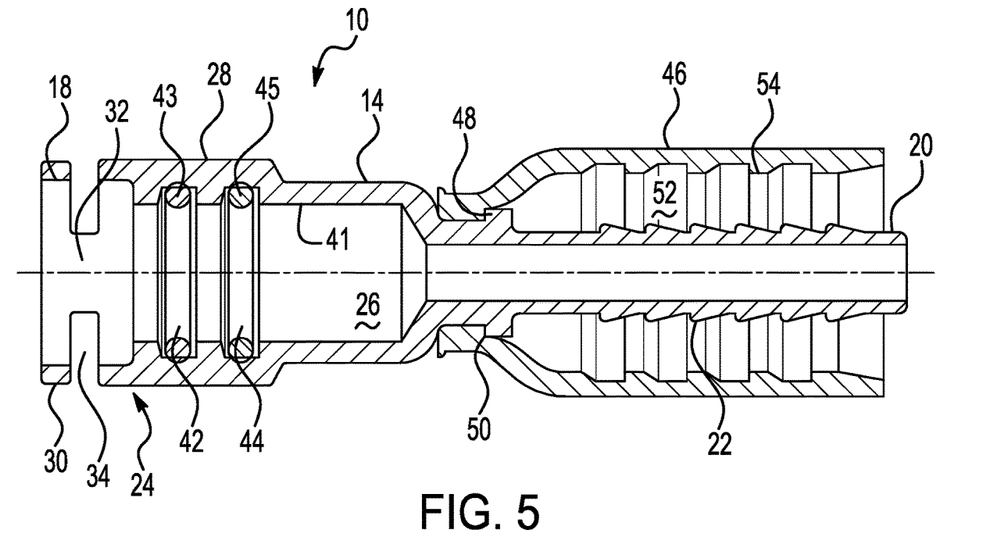
FIG. 5 is a drawing depicting the fitting body of FIG. 3 further connected to a shell component.

FIG. 5 is a drawing depicting the fitting body 14 of FIG. 3 further connected to a shell component 46. The shell component 46 particularly is employed in applications in which the second end 20 of the fitting body specifically is configured as a ribbed nipple for receiving a hose. The shell component 46 may be made of metal-based materials comparably as the fitting body 14. The fitting body 14 includes a shoulder 48, and the shell component 46 includes an opposing shoulder 50, which interact with each other to retain the shell connected to the fitting body. During assembly, the shell 46 is simply slid over the fitting body 14 to align the opposing shoulders 48 and 50. FIG. 5 illustrates an initial state of assembly. In such initial state, the shell component 46 flares radially outward from the opposing shoulder 50, such that the ribbed surface of the nipple end 20 of the fitting body and an inner surface of the shell 46 define a hose receiving space 52. In addition, the inner surface of the shell component 46 includes a plurality of barbs 54.

To connect a hose to the fitting assembly 10, the hose (not shown) is forced over the ribbed nipple second end 20 of the fitting body 14. The hose, therefore, is located within the hose receiving space 52 and is partially retained by the ribs 22. The shell component 46 then is crimped onto the hose using a suitable crimping tool as are known in the art, and the barbs 54 bite into the outer surface of the hose to form a tight connection of the hose to the fitting assembly 10.

Figure 6:
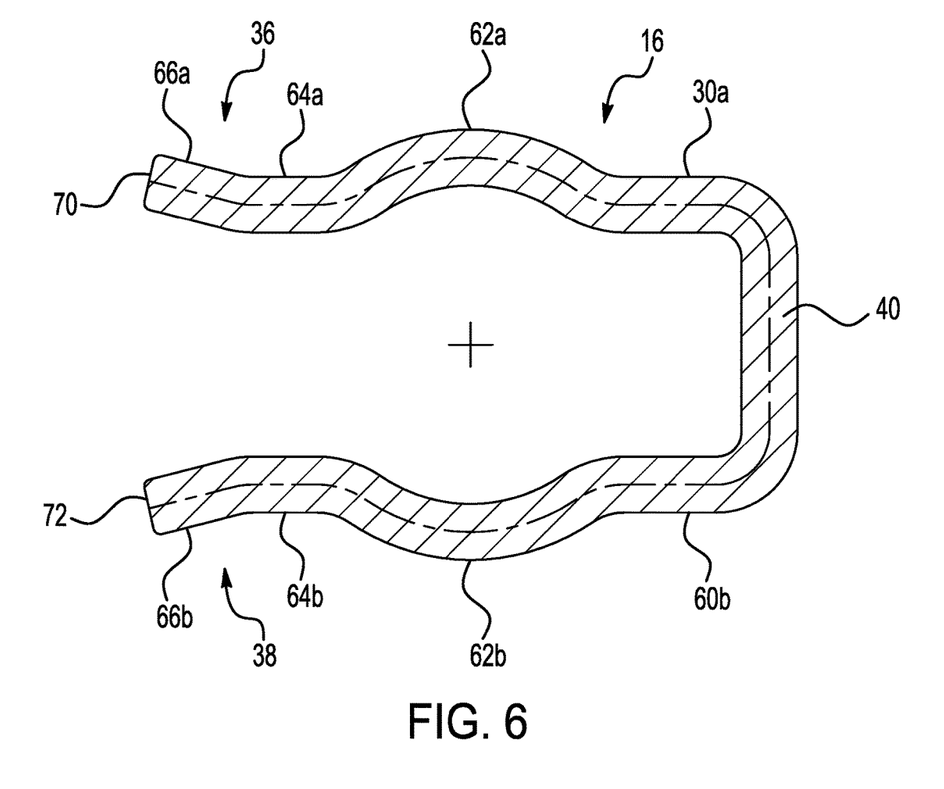
FIG. 6 is a drawing depicting a side view of a clip component of the fitting assembly of FIG. 1 in isolation.

As referenced above, to secure the tube end 12 to the fitting assembly 10, the tube end 12 is inserted through the first end 18 of the fitting body 14, and the clip 16 is employed to lock the tube end within the fitting body 14. FIG. 6 is a drawing depicting a side view of the clip component 16 of the fitting assembly 10 of FIG. 1 in isolation. As also referenced above, the clip 16 includes opposing legs 36 and 38 that extend from a transverse segment 40. In addition, the legs 36 and 38 form substantially right angles (e.g., 90°±10°) with the transverse segment 40 where the respective legs and transverse segment join.

As depicted in example of FIG. 6, each of the legs 36 and 38 may be divided into a plurality of segments, and in the depicted example the segments are mirror images of each other, i.e., the segments of the first leg 36 are mirror image of the segments of the second leg 38. In one exemplary embodiment, first segments 60a/60b extend from the transverse segment 40 at the substantially right angle referenced above. Accordingly, looking at the legs individually, the first segment 60a of the first leg 36 and the first segment 60b of the second leg 38 essentially are parallel to each other. Second segments 62a/62b extend from the first segments 60a/60b in a direction away from the transverse segment 40. The second segments 62a/62b are curved segments having a radius of curvature about a center point "+" identified in FIG. 6, suitable for locking around the tube end 12 as configured for any particular application. Accordingly, looking at the legs individually, the second segment 62a of the first leg 36 and the second segment 62b of the second leg 38 have opposing curvatures so that together the second segments encompass or surround and thereby lock the tube end 12 within the fitting body 14 when in the connected state. Third segments 64a/64b extend from the second segments in a direction away from the transverse segment 40 and also at the substantially right angle relative to the transverse segment referenced above. Accordingly, looking at the legs individually, the third segment 64a of the first leg 36 and the third segment 64b of the second leg 38 essentially are parallel to each other, and further essentially are aligned with the first segments 60a/60b. Fourth segments 66a/66b extend from the third segments in a direction away from the transverse segment, and the fourth segments 66a/66b are flared outward relative to the third segments. Accordingly, looking at the legs individually, the fourth segment 66a of the first leg 36 and the fourth segment 66b of the second leg 38 flare in opposite directions and away from each other. Any suitable angle of flare may be employed. Generally, the flare angle should be sufficiently large to promote spreading of the clip when pressed into place around the tube end for assembly, as an angle too low might cause the legs to damage the male tube end if tips of the clip legs dig into the tube end.

Figure 7:
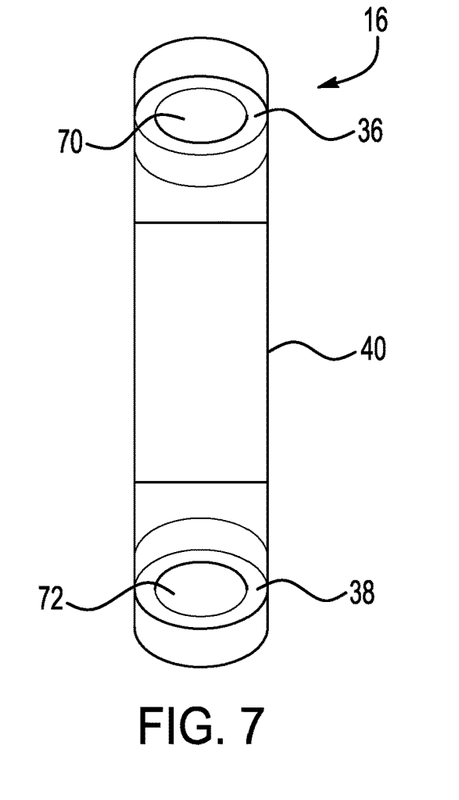
FIG. 7 is a drawing depicting an end view of the clip component of FIG. 6.

FIG. 7 is a drawing depicting an end view of the clip component 16 of FIG. 6. As shown in FIGS. 6 and 7, the fourth and flared segments 66a and 66b terminate respectively at a first clip end 70 and a second clip end 72. As shown in FIG. 7, the clip legs 36 and 38 widen from the clip ends 70 and 72 towards the transverse segment 40.

Referring to FIGS. 1 and 2 in combination with FIGS. 6 and 7, the tube end 12 is connected to the fitting assembly 10 as follows. As referenced above, the tube end 12 is inserted through the first end 18 of the fitting body 14 toward the second end 20 sufficiently such that the interacting feature (ridge) 13 of the tube end is located past the clip slot 34 relative to the first end 18 of the fitting body. Once the tube end is positioned as such, the clip 16 is inserted through the clip slot 34. The flared fourth segments 66a and 66b of the clip 16 aid in insertion of the clip. The clip legs 36 and 38 act much like a spring that is biased in a native position as illustrated in the isolated view of FIG. 6. As the clip 16 is pressed through the clip slot 34 towards a locking position, a wedging action of the tube end 12 against the flared fourth segments 66a and 66b spreads the clip legs 36 and 38 apart so the clip can be inserted around the tube end 12. As referenced above, the clip legs 36 and 38 widen from the clip ends 70 and 72 towards the transverse segment 40. This aids in spreading the clip legs apart as the clip is inserted through the clip slot 34 and about the tube end 12. The clip is inserted through the clip slot 34 until the tube end 32 rests between the curved third segments 64a and 64b, and the bias of the clip 16 provides a tight hold of the tube end 12, with the interaction with the ridge 13 of the tub end 12 locking the tube end in place. The transverse segment 40 interacting against the bridge 32 of the fitting body 14 prevents further insertion of the clip 16 though the clip slip slot 34.

As referenced above, in the connected state as shown in FIG. 1, the transverse segment 40 of the clip 16 spans across the bridge 32 of the fitting body 14. The clip 16 is maintained in place within the clip slot 34 between the main body 28 and ring end 30 of the fitting body 14, and the interaction of the interacting feature 13 of the tube end 12 with the clip legs 36 and 38 prevents the tube end from pulling out from the fitting body 14. In addition, the widening of the clip legs 36 and 38 in a direction from the clip ends 70 and 72 toward the traverse segment 40, with the transverse segment 40 being the widest portion of the clip 16, results in a strong hold of the clip 16 against the bridge 32 of the fitting body 14 to preclude breaking of the clip at the transverse segment as the clip interacts against the bridge 32 to lock the tube end in place.

The clip 16 can be removed from the fitting body 14 with common hand tools, such as for example a screwdriver or pliers that can wedge or "pop" the clip from the fitting body 14. In particular, a wedging action of the tool can spread the legs 36 and 38 apart against the clip bias, and the legs can then be pushed past the tube end along the clip slot until the clip is removed. The configuration thus does not employ a dedicated removal component added to the fitting body as is common in conventional configurations. Once the clip 16 is removed, the tube end 12 then can be pulled from the fitting body 14.

Figure 8:
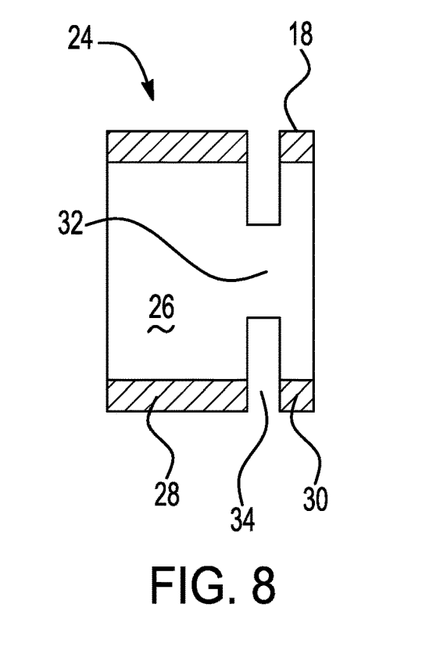
FIG. 8 is a drawing depicting a non-limiting example of a close-up view of the tube connecting end portion of the fitting body similarly as depicted FIG. 4, that is particularly suitable for providing a freeze resistant fitting for a low temperature application.

FIG. 8 is a drawing depicting a non-limiting example of a close-up view of a tube connecting end portion 24 of the fitting body similarly as depicted in FIG. 4, and that is particularly suitable for providing a freeze resistant fitting configuration for a low temperature application. It will be appreciated that FIG. 8 represents a particular example, and variations may be employed as suitable for particular applications. As referenced above, in one application of quick connect fittings, diesel emission after treatment systems utilize aqueous urea (high ammonia solutions) for nitrous oxide reduction. These fluids have a freeze temperature of about 13° F., and thus environmental conditions in cold climates can cause the fluid to freeze. Freezing urea expands and produces excessive forces on fluid conveyance hoses and fittings, and the example of FIG. 8 provides one configuration designed to be freeze resistant to avoid fitting failure under such conditions.

Referring to the example of FIG. 8, D1 denotes an inner diameter of the fitting body 14, which again includes the main body 28 and the ring end 30 connected by the bridge 32. D2 denotes an outer diameter of the fitting body 14. W1 denotes a longitudinal dimension of the ring end 30 (i.e., the dimension in a direction of fluid flow), and W2 denotes a width dimension of the ring end 30 perpendicular to W1 (i.e., the dimension perpendicular to the direction of fluid flow). Accordingly, the ring end 30 has a cross-sectional area of W1×W2. W3 denotes a width dimension of the bridge 32, and S1 denotes a longitudinal dimension (in the direction of fluid flow) of the clip slot 34 that is defined between the main body 28 and the ring end 30. The example dimensions are set forth in inches in FIG. 8 for illustrative purposes.

SAE J2044/J2045 specifications require a minimum tensile force of 450N or 101 lbf at 23° C. (room temperature). It has been determined through field performance and laboratory testing, however, that this specification is inadequate to prevent fitting failure from a freezing fluid event. Laboratory testing has determined that a fitting tensile strength of at least 500 lbf (2200 Newtons) is preferred to prevent freeze failure, which generally occurs at plastic fitting distortion greater than 5% in glass filled polymers. To design a fitting body that meets the conditions for being considered freeze resistant, the following design elements are optimized in accordance with embodiments of the present application. (1) Fitting Material—the fitting material is selected for strength sufficient to prevent freeze failure, and for chemical resistance to corrosion which can be an issue for example in diesel emission treatment systems. (2) Fitting Diameter-fitting body inner and outer diameters are selected for proper sizing and mating with corresponding SAE J2044 tube stub dimensions and minimized to provide maximum spacing for installation. (3) Bridge Configuration—the bridge (element 32 in the figures) is configured to satisfy the requisite strength requirements to be freeze resistant; (4) Ring End—the ring end (element 30 in the figures), which receives the focus of the tensile load during a freeze event or tensile test, is configured to satisfy the requisite strength requirements to be freeze resistant.

As to the fitting material, stainless steel is a suitable material choice because stainless steel resists corrosion and degradation from urea solutions, and has sufficient strength to prevent distortion at much higher loads as compared to the strength of conventional glass filled (15-30%) plastics (polyamides, PPA). Brass and plated carbon steel may not be suitable for diesel emission system applications due to poor corrosion resistance to urea, but potentially could be used for freeze resistance in other applications that may not present corrosion issues. Stainless steel material properties generally are approximately the following: modulus: 28000 ksi, tensile strength: 73000 psi, and yield strength: 31000 psi. In contrast, a typical Nylon 12-30% glass filled polymer has following properties: modulus: 942 ksi, and tensile break strength of 17,400 psi with only 5% strain at break. Such properties generally would not be sufficient to provide such freeze resistance.

As to the fitting inner and outer diameters, for particular usage in accordance with J2044 applications, the fitting outer diameter D2 is restricted to a range between ½" (12.7 mm) to ¾" (19 mm) to match the size requirements for the corresponding SAE J2044 tube stub dimensions, and to maintain a small profile for ease of installation and to prevent crowding when two or more fittings are installed next to one another. The SAE J2044 tube stubs sizes mainly used include: ¼" (6.3 mm), 5/16" (7.9 mm), and ⅜" (9.5 mm) diameter(s), and the referenced range of outer diameter D2 is sized to accommodate a corresponding tube stub size. The fitting inner diameter is selected relative to the particular SAE J2044 tube stub size being used and the corresponding specified bead diameter as is known in the art. Generally, as is known in the art inner diameter D1 is equal to the bead diameter plus 0.015" (0.4 mm) to 0.039" (1 mm) for sufficient clearance for fit-up and insertion.

As to the configuration of the bridge, in exemplary embodiments the bridge width W3 is within a range of 20% to 70% of the fitting body outer diameter D1 to allow proper spacing and alignment of the wire clip 16 to provide an effective engagement to the SAE J2044 male tube stub. A bridge width W3 below about 20% of the fitting body outer diameter D1 may not provide enough tensile strength to be freeze resistant, and a bridge width W3 greater than about 70% of the fitting body outer diameter D1 may not provide enough spacing for effective installation of the wire clip 16. For example, for a fitting designed for SAE J2044⅜" tube stub, the bridge width W3 would fall between (2.7 mm) 0.100" and (9.6 mm) 0.375".

As to the configuration of the ring end, it has been determined through finite element analysis (FEA) and laboratory testing that the ring end experiences the highest level of distortion or deformation during a freeze event. Accordingly, to prevent failure or significant distorting during a freeze event, the ring end is configured to minimize distortion to 0.010" (0.25 mm) or less at the target tensile load of 500 lbf (2200 Newtons) that occurs during a urea freezing event. To meet this requirement, the ring end is configured to have a minimum cross-sectional area (W1×W2) of 2.9 mm² or 0.0045 square inches for a ⅜" SAE J2044 male stub. Minimizing the distortion of the fitting to 0.010" (0.25 mm) or less enables the fitting to maintain the functional requirements of sealing and the ability to decouple and reassemble the fitting for system maintenance and/or repair. More generally, normalizing the ring end cross-sectional area relative to the fitting inner diameter D1, a ratio of ring end cross-sectional area to the fitting body inner diameter D1 should be from 21% to 73%. For example, applying such normalization to a ⅜" SAE J2044 male stub, this yields a minimum ratio of 0.212, or 2.9/13.7. To prevent fitting installation issues while meeting such ratio parameters, the longitudinal dimension W1 of the ring end may be restricted to approximately 0.400" or 10 mm, and this results in the width dimension W2 being sized to achieve a maximum area (W1×W2)/D1 ratio of 0.729=10/13.7.

Figure 9:
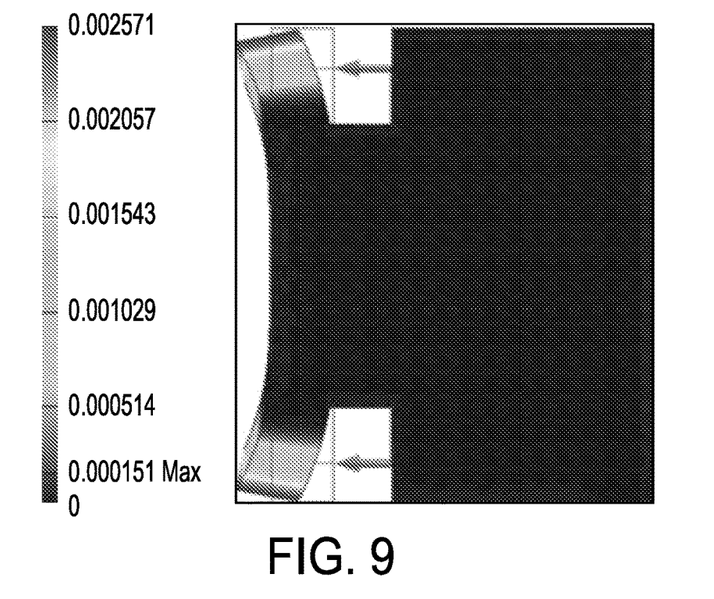
FIG. 9 is a drawing depicting a graphical representation of finite element analysis results of a fitting body configuration comparably as illustrated in FIG. 8.

Design parameters were investigated using FEA to determine the efficacy of configurations comparably as set forth above. FIG. 9 is a drawing depicting a graphical representation of the FEA results, with such results being set forth in the table below. As shown using the FEA results, the ring end sustains the highest level of distortion during tensile loading. Iterations of FEA were performed to determine the cross-sectional area dimension of the ring end made with stainless steel to resist 0.010" displacement under a load of 500 lbf. The FEA results verify that a suitable ring cross-sectional area should be 21% or greater as a ratio to fitting body outer diameter D1 to achieve a freeze resistant configuration.

within the fitting body. The fitting body includes a main body and a ring end that define the clip slot between the main body and the ring end, the fitting body further including a bridge, and the main body and the ring end are attached to each other by the bridge. To be freeze resistant, the ring end is configured to minimize distortion to 0.010" (0.25 mm) or less at a tensile load of 500 lbf (2200 Newtons). The fitting assembly may include one or more of the following features, either individually or in combination.

In an exemplary embodiment of the fitting assembly, a ratio of a cross-sectional area of the ring end to an inner diameter of the fitting body is from 21% to 73%.

In an exemplary embodiment of the fitting assembly, the fitting assembly is configured to connect to a ⅜" SAE J2044 male stub, and the ratio of the cross-sectional area of the ring end to the inner diameter of the fitting body has a minimum ratio of 0.212 and a maximum ratio of 0.729.

In an exemplary embodiment of the fitting assembly, the ring end has a longitudinal dimension of 0.400" (10 mm).

In an exemplary embodiment of the fitting assembly, the bridge has a width within a range of 20% to 70% of an outer diameter of the fitting body.

In an exemplary embodiment of the fitting assembly, the clip includes first and second opposing legs that extend from a transverse segment, wherein in the connected state the transverse segment spans across the bridge of the fitting body and the opposing legs extend through the clip slot.

In an exemplary embodiment of the fitting assembly, each of the first and second opposing legs of the clip comprises: a first segment that extends from the transverse segment; a second segment that extends from the first segment in a direction away from the transverse segment, wherein the second segment of the first leg and the second segment of the second leg are oppositely are curved about a center point suitable for locking around the tube end; a third segment that

| Case | 1 | 2 | 3 | 4 | 5 | 6 | 7 | 8 |
|---|---|---|---|---|---|---|---|---|
| SAE Size | 3/8 | 3/8 | 3/8 | 3/8 | 3/8 | 3/8 | 3/8 | 3/8 |
| D1 | 13.7 mm | 13.7 mm | 13.7 mm | 13.7 mm | 13.7 mm | 13.7 mm | 13.7 mm | 13.7 mm |
| W1 (inch/mm) | .050 | .050 | .075 | .089 | .100 | .125 | .083 | .150 |
|  | 1.27 | 1.27 | 1.9 | 2.25 | 2.5 | 3.2 | 2.1 | 3.8 |
| W2 (inch/mm) | .050 | .050 | .050 | .050 | .050 | .050 | .075 | .050 |
|  | 1.27 | 1.27 | 1.27 | 1.27 | 1.27 | 1.27 | 1.9 | 1.27 |
| (CS) Cross | 0.0025 | 0.0025 | 0.0034 | 0.0034 | 0.0050 | 0.00625 | 0.00623 | 0.0075 |
| Section (inch/mm) | 1.6 | 1.6 | 2.4 | 2.9 | 3.2 | 4.1 | 4.0 | 4.8 |
| W3 | 0.110 | .225 | .225 | .225 | .225 | .225 | .225 | .225 |
| (inch/mm) | (30% R) | (60% R) | (60% R) | (60% R) | (60% R) | (60% R) | (60% R) | (60% R) |
| Ratio: CS/D1 (%) | 11.7% | 11.7% | 17.5% | 21.2% | 23.4% | 29.9% | 29.2% | 35.0% |
| SAE Min, 101 lbf | 0.0097 | 0.0059 | 0.0025 | 0.0019 | 0.0015 | 0.0010 | 0.0014 | 0.0007 |
| 200 lbf | 0.0195 | 0.0119 | 0.0050 | 0.0039 | 0.0029 | 0.0021 | 0.0028 | 0.0015 |
| 500 lbf |  |  | 0.0125 | .0097 | 0.0073 | 0.0052 | 0.0070 | 0.0039 |
| 1000 lbf |  |  |  |  |  | 0.0104 | 0.0140 | 0.0078 |

An aspect of the invention is a metallic fitting assembly that is freeze resistant and that employs a clip-to-body attachment for locking a tube end of a fluid system component to the fitting assembly. In exemplary embodiments, the fitting assembly includes a fitting body defining a fluid flow path between a first end and a second end opposite from the first end, wherein the first end is configured to receive a tube end of a first fluid system component, and the fitting body defines a clip slot adjacent to the first end, and a material of the fitting body includes metal; and a clip wherein a material of the clip includes metal. When the tube end is inserted through the first end of the fitting body, the clip is inserted through the clip slot and around the tube end to engage the tube end in a connected state in which the tube end is locked extends from the second segment in a direction away from the transverse segment; and a fourth segment that extends from the third segment in a direction away from the transverse segment, and the fourth segment of the first leg and the fourth segment of the second leg respectively are flared in opposite directions from the third segment of the first leg and the third segment of the second leg.

In an exemplary embodiment of the fitting assembly, the first segments extend from the transverse segment at substantially right angles such that the first segment of the first leg and the first segment of the second leg are parallel, and the third segments respectively are aligned with the first segments.

In an exemplary embodiment of the fitting assembly, the first leg terminates at a first clip end and the second leg terminates at a second clip end, and the first and second legs widen from the first and second clip ends towards the transverse segment.

In an exemplary embodiment of the fitting assembly, the segments of the first leg are a mirror image of the segments of the second leg.

In an exemplary embodiment of the fitting assembly, the fitting body and/or the clip are made of stainless steel.

In an exemplary embodiment of the fitting assembly, the fitting assembly conforms to SAE J2044 standards.

In an exemplary embodiment of the fitting assembly, the fitting assembly further includes a sealing element that seals against an outer surface of the tube end in the connected state.

In an exemplary embodiment of the fitting assembly, an inner diameter of the sealing body includes a groove, and the sealing element is an O-ring seal that is positioned within the groove.

In an exemplary embodiment of the fitting assembly, metal materials of the fitting body and clip have a yield strength above 50 kpsi.

In an exemplary embodiment of the fitting assembly, the second end of the fitting body is configured to connect to a second component of the fluid system.

In an exemplary embodiment of the fitting assembly, the second end of the fitting body is a ribbed nipple that is configured to receive a hose.

In an exemplary embodiment of the fitting assembly, the fitting assembly further includes a shell that is connected to the second end of the fitting body, wherein the nipple and shell define a space for receiving the hose, and the shell is crimped about the hose to connect the hose to the fitting assembly.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A freeze-resistant quick connect fitting assembly for connecting components of a fluid system, the fitting assembly comprising:
    a fitting body defining a fluid flow path between a first end and a second end opposite from the first end, wherein the first end is configured to receive a tube end of a first fluid system component, and the fitting body defines a clip slot adjacent to the first end, and a material of the fitting body includes metal; and
    a clip wherein a material of the clip includes metal, and when the tube end is inserted through the first end of the fitting body, the clip is inserted through the clip slot and around the tube end to engage the tube end in a connected state in which the tube end is locked within the fitting body;
    wherein the fitting body includes a main body and a ring end that define the clip slot between the main body and the ring end, the fitting body further including a bridge, and the main body and the ring end are attached to each other by the bridge;
    wherein the ring end is configured to minimize distortion of the ring end to 0.010" (0.25 mm) or less at a tensile load of 500 lbf (2200 Newtons); and
    wherein a ratio of a cross-sectional area of the ring end to an inner diameter of the fitting body ranges from 21% to 73%.

2. The fitting assembly of claim 1, wherein the fitting assembly is configured to connect to a ⅜" male stub, and the ratio of the cross-sectional area of the ring end to the inner diameter of the fitting body has a minimum ratio of 0.212 and a maximum ratio of 0.729.

3. The fitting assembly of claim 2, wherein the ring end has a longitudinal dimension of 0.400" (10 mm).

4. The fitting assembly of claim 1, wherein the bridge has a width within a range of 20% to 70% of an outer diameter of the fitting body.

5. The fitting assembly of claim 1, wherein the clip includes first and second opposing legs that extend from a transverse segment, wherein in the connected state the transverse segment spans across the bridge of the fitting body and the opposing legs extend through the clip slot.

6. The fitting assembly of claim 5, wherein each of the first and second opposing legs of the clip comprises:
    a first segment that extends from the transverse segment;
    a second segment that extends from the first segment in a direction away from the transverse segment, wherein the second segment of the first leg and the second segment of the second leg are oppositely curved about a center point suitable for locking around the tube end;
    a third segment that extends from the second segment in a direction away from the transverse segment; and
    a fourth segment that extends from the third segment in a direction away from the transverse segment, and the fourth segment of the first leg and the fourth segment of the second leg respectively are flared in opposite directions from the third segment of the first leg and the third segment of the second leg.

7. The fitting assembly of claim 6, wherein the first segments extend from the transverse segment at substantially right angles such that the first segment of the first leg and the first segment of the second leg are parallel, and the third segments respectively are aligned with the first segments.

8. The fitting assembly of claim 5, wherein the first leg terminates at a first clip end and the second leg terminates at a second clip end, and the first and second legs widen from the first and second clip ends towards the transverse segment.

9. The fitting assembly of claim 6, wherein the segments of the first leg are a mirror image of the segments of the second leg.

10. The fitting assembly of claim 1, wherein the fitting body and/or the clip are made of stainless steel.

11. The fitting assembly of claim 1, further comprising a sealing element that seals against an outer surface of the tube end in the connected state.

12. The fitting assembly of claim 11, wherein an inner diameter of the sealing body includes a groove, and the sealing element is an O-ring seal that is positioned within the groove.

13. The fitting assembly of claim 1, wherein metal materials of the fitting body and clip have a yield strength above 50 kpsi.

14. The fitting assembly of claim 1, wherein the second end of the fitting body is configured to connect to a second component of the fluid system.

15. The fitting assembly of claim 14, wherein the second end of the fitting body is a ribbed nipple that is configured to receive a hose.

16. The fitting assembly of claim 15, further comprising a shell that is connected to the second end of the fitting body, wherein the nipple and shell define a space for receiving the hose, and the shell is crimped about the hose to connect the hose to the fitting assembly.

\* \* \* \* \*